(12) United States Patent
Sakurai

(10) Patent No.: US 11,774,643 B2
(45) Date of Patent: Oct. 3, 2023

(54) OPTICAL UNIT

(71) Applicant: KOITO MANUFACTURING CO., LTD., Tokyo (JP)

(72) Inventor: Kazutoshi Sakurai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/721,489

(22) Filed: Apr. 15, 2022

(65) Prior Publication Data

US 2022/0236458 A1 Jul. 28, 2022

Related U.S. Application Data

(63) Continuation of application No. PCT/JP2020/038832, filed on Oct. 14, 2020.

(30) Foreign Application Priority Data

Oct. 31, 2019 (JP) .................. 2019-198799

(51) Int. Cl.
| | |
|---|---|
| *G02B 26/10* | (2006.01) |
| *G02B 3/06* | (2006.01) |
| *G03B 21/14* | (2006.01) |
| *G03B 21/20* | (2006.01) |

(52) U.S. Cl.
CPC .............. *G02B 3/06* (2013.01); *G03B 21/142* (2013.01); *G03B 21/206* (2013.01)

(58) Field of Classification Search
CPC ..... G02B 26/10; G02B 26/101; G02B 26/108
See application file for complete search history.

(56) References Cited

U.S. PATENT DOCUMENTS

2014/0092618 A1* 4/2014 Yagi ...................... F21S 41/663
362/512

FOREIGN PATENT DOCUMENTS

| JP | S60192306 U | 12/1985 |
|---|---|---|
| JP | H1116411 A | 1/1999 |
| JP | 2008175869 A | 7/2008 |
| JP | 2010091905 A | 4/2010 |
| JP | 2012256494 A | 12/2012 |

OTHER PUBLICATIONS

International Search Report (PCT/ISA/210), dated Dec. 15, 2020, by the Japan Patent Office, and International Preliminary Report on Patentability with Written Opinion (PCT/ISA/237), and English translations, for International Application No. PCT/JP2020/038832.

* cited by examiner

*Primary Examiner* — Joseph P Martinez
(74) *Attorney, Agent, or Firm* — BUCHANAN INGERSOLL & ROONEY PC

(57) ABSTRACT

An optical unit includes a cylindrical rotatable lens and a light source provided in the rotatable lens. The rotatable lens is configured such that a light output from the light source is incident via an inner circumferential surface and is output via an outer circumferential surface as an irradiating beam, and a predetermined irradiated area is formed by scanning a space in front with the irradiating beam according to a periodical movement of the rotatable lens.

5 Claims, 5 Drawing Sheets

OPTICAL UNIT

BACKGROUND OF THE INVENTION

1. Technical Field

The present invention relates to an optical unit and an optical unit used in a vehicle lamp.

2. Description of the Related Art

An optical unit provided with a lens in which a light output from a light source is incident from behind and which outputs the light in front of a vehicle as an irradiating beam and configured to form a predetermined light distribution pattern by scanning an area in front of the vehicle with a transmitted light transmitted through the lens is proposed in the related art.

Patent document 1: JP2012-256494

The lens provided in the above-mentioned optical unit is a transparent disc-shaped member, and the rotation axis of the lens is parallel to the light axis. This requires that the motor for driving the lens be provided behind the lens and requires a space in the longitudinal direction.

SUMMARY OF THE INVENTION

The present invention addresses the above-described issue and an illustrative purpose thereof is to provide a novel optical unit for scanning with a light of a light source.

An optical unit according to an embodiment of the present invention includes: a cylindrical rotatable lens; and a light source provided in the rotatable lens. The rotatable lens is configured such that a light output from the light source is incident via an inner circumferential surface and is output via an outer circumferential surface as an irradiating beam, and a predetermined irradiated area is formed by scanning a space in front with the irradiating beam according to a periodical movement of the rotatable lens.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
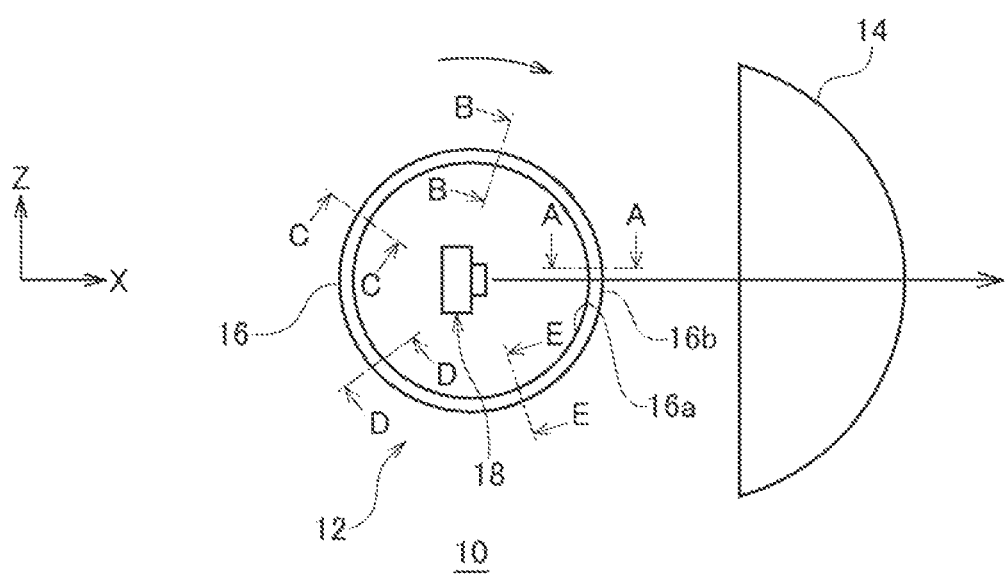
FIG. 1 is a schematic side view of the vehicle headlamp according to the first embodiment.

An optical unit according to an embodiment of the present invention includes: a cylindrical rotatable lens; and a light source provided in the rotatable lens. The rotatable lens is configured such that a light output from the light source is incident via an inner circumferential surface and is output via an outer circumferential surface as an irradiating beam, and a predetermined irradiated area is formed by scanning a space in front with the irradiating beam according to a periodical movement of the rotatable lens.

According to this embodiment, the predetermined irradiated area can be formed by scanning the space in front with the irradiating beam according to the periodical movement of the cylindrical rotatable lens. As compared with the case of forming a predetermined irradiated area directly with the light output from the light source, the size of the light source can be reduced.

The rotatable lens may be configured to be rotated around a rotary shaft coupled to a driving unit such that a direction of refraction of a light output from the light source and transmitted through the rotatable lens varies periodically. In this manner, scanning by using the light of the light source can be realized by a simple configuration.

The light source may be arranged such that a frontal direction of an output surface intersects the rotary shaft. This causes the output surface of the light source to face the inner circumferential surface of the rotatable lens.

The rotatable lens may be arranged such that the rotary shaft is aligned with a direction of vehicle width of the vehicle. This reduces the space of the optical unit in the vehicle longitudinal direction.

The light source may be configured such that an intensity of light varies in a certain phase range in a period of movement of the rotatable lens. This can change the brightness in a portion of the predetermined irradiated area.

Optional combinations of the aforementioned constituting elements, and implementations of the invention in the form of methods, apparatuses, and systems may also be practiced as additional modes of the present invention.

Hereinafter, the invention will be described based on preferred embodiments with reference to the accompanying drawings. Identical or like constituting elements, members, processes shown in the drawings are represented by identical symbols and a duplicate description will be omitted as appropriate. The embodiments of the present invention are not limited to those described and appropriate combinations or replacements of the features of the embodiment are also encompassed by the present invention.

First Embodiment

The optical unit according to the embodiment can be used in various vehicle lamps. First, a description will be given of an outline of a vehicle headlamp in which the optical unit according to the embodiment described below can be mounted.

Figure 2:
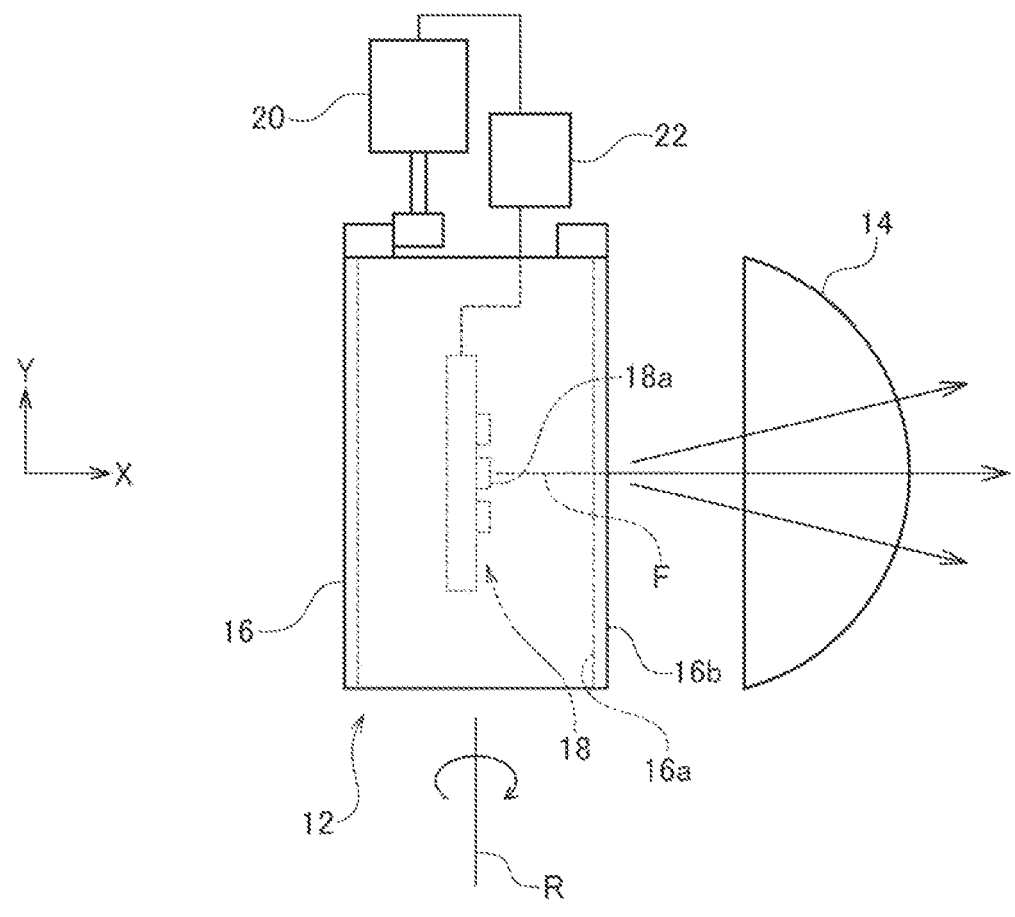
FIG. 2 is a schematic top view of the vehicle headlamp according to the first embodiment.

FIG. 1 is a schematic side view of the vehicle headlamp according to the first embodiment. FIG. 2 is a schematic top view of the vehicle headlamp according to the first embodiment.

A vehicle headlamp 10 includes an optical unit 12 and a projection lens 14 that projects a light source image output from the optical unit 12 in front of the vehicle. The optical unit 12 includes a cylindrical rotatable lens 16, a semiconductor light-emitting element 18 as a light source provided in the rotatable lens 16, a motor 20 provided to the side of the rotatable lens 16 and driving the rotatable lens 16 into rotation, and a control unit 22 that controls the lighting and extinguishing of the semiconductor light-emitting element 18 and the driving of the motor 20.

For example, a light emitting diode (LED), a laser diode (LD), or an organic light emitting diode (OLED) is preferable as the semiconductor light-emitting element 18. Further, the light source may be other than a semiconductor light-emitting element so long as it is small enough to be accommodated in the rotatable lens 16.

A transmitting area of the rotatable lens 16 is formed by a transparent material such as glass and plastic. The rotatable lens 16 is configured such that the light output from the semiconductor light-emitting element 18 is incident via an inner circumferential surface 16a of the transmitting area and is output via an outer circumferential surface 16b of the transmitting area as an irradiating beam. Further, the rotatable lens 16 is driven by the motor 20 and is configured to form a predetermined irradiated area by scanning the space in front with the irradiating beam horizontally according to a periodic movement (rotational movement) around a rotary shaft R. More specifically, the configuration is realized by appropriately devising the surface shape of the inner circumferential surface 16a and the outer circumferential surface 16b.

Figure 3A:
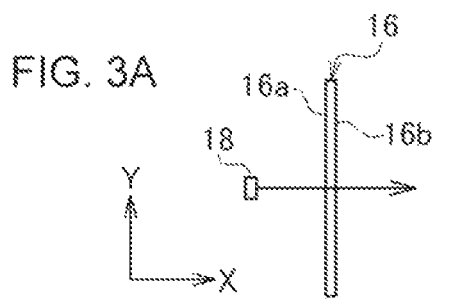
FIG. 3A is an A-A cross-sectional view of the rotatable lens shown in FIG. 1.
Figure 3F:
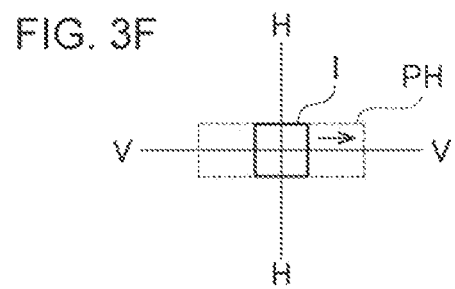
FIG. 3F shows a projected image formed by the irradiating beam transmitted through the cross-sectional shape shown in FIG. 3A.
Figure 3B:
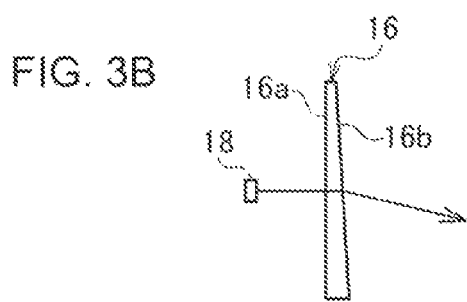
FIG. 3B is a B-B cross-sectional view of the rotatable lens shown in FIG. 1.
Figure 3G:
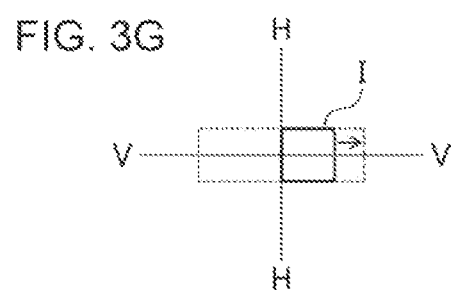
FIG. 3G shows a projected image formed by the irradiating beam transmitted through the cross-sectional shape shown in FIG. 3B.
Figure 3C:
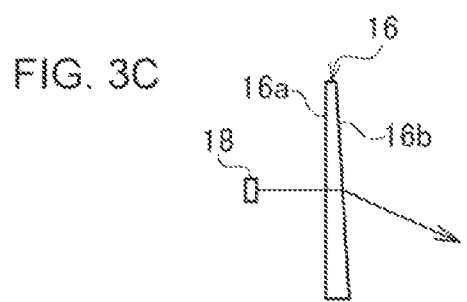
FIG. 3C is a C-C cross-sectional view of the rotatable lens shown in FIG. 1.
Figure 3H:
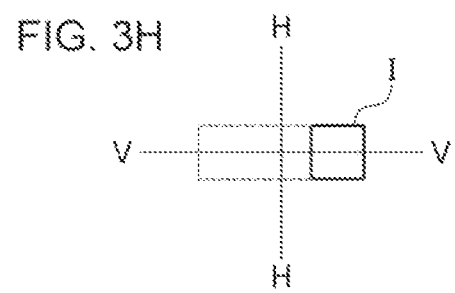
FIG. 3H shows a projected image formed by the irradiating beam transmitted through the cross-sectional shape shown in FIG. 3C.
Figure 3D:
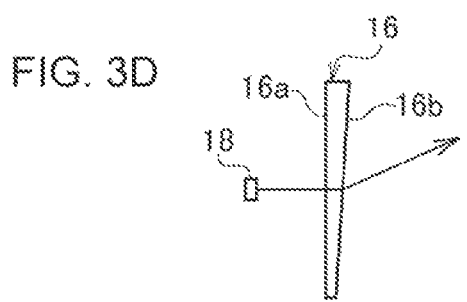
FIG. 3D is a D-D cross-sectional view of the rotatable lens shown in FIG. 1.
Figure 3I:
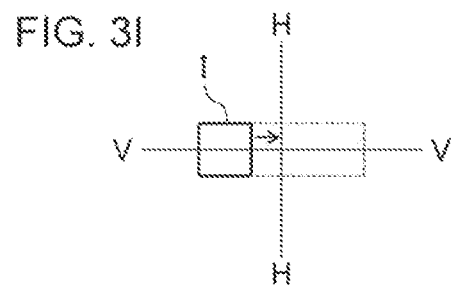
FIG. 3I shows a projected image formed by the irradiating beam transmitted through the cross-sectional shape shown in FIG. 3D.
Figure 3E:
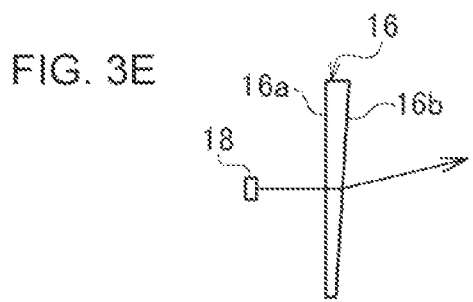
FIG. 3E is a E-E cross-sectional view of the rotatable lens shown in FIG. 1.
Figure 3J:
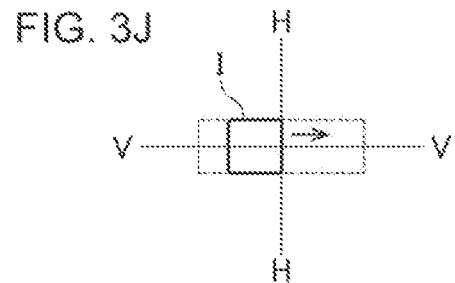
FIG. 3J shows a projected image formed by the irradiating beam transmitted through the cross-sectional shape shown in FIG. 3E.

FIG. 3A is an A-A cross-sectional view of the rotatable lens shown in FIG. 1, FIG. 3B is a B-B cross-sectional view of the rotatable lens shown in FIG. 1, FIG. 3C is a C-C cross-sectional view of the rotatable lens shown in FIG. 1, FIG. 3D is a D-D cross-sectional view of the rotatable lens shown in FIG. 1, FIG. 3E is a E-E cross-sectional view of the rotatable lens shown in FIG. 1, FIG. 3F shows a projected image formed by the irradiating beam transmitted through the cross-sectional shape shown in FIG. 3A, FIG. 3G shows a projected image formed by the irradiating beam transmitted through the cross-sectional shape shown in FIG. 3B, FIG. 3H shows a projected image formed by the irradiating beam transmitted through the cross-sectional shape shown in FIG. 3C, FIG. 3I shows a projected image formed by the irradiating beam transmitted through the cross-sectional shape shown in FIG. 3D, and FIG. 3J shows a projected image formed by the irradiating beam transmitted through the cross-sectional shape shown in FIG. 3E.

The A-A cross section is positioned at the angle of rotation of the rotatable lens 16 of 0 degrees, the B-B cross section is positioned at the angle of rotation of the rotatable lens 16 of 72 degrees, the C-C cross section is positioned at the angle of rotation of the rotatable lens 16 of 144 degrees, the D-D cross section is positioned at the angle of rotation of the rotatable lens 16 of 216 degrees, and the E-E cross section is positioned at the angle of rotation of the rotatable lens 16 of 288 degrees.

As shown in FIGS. 3F-3J, a projected image I moves gradually in the right direction of the figure. Thus, the vehicle headlamp 10 can form a predetermined irradiated area (a high beam light distribution pattern PH) by scanning the space in front with the irradiating beam according to the periodical movement of the cylindrical rotatable lens 16. As compared with the case of forming a predetermined irradiated area (the projected image I) directly with the light output from the semiconductor light-emitting element 18, therefore, scanning with the irradiating beam can form a high beam light distribution pattern PH wider than the projected image I. Therefore, the size of or the number of semiconductor light-emitting element(s) 18 can be reduced.

Further, the rotatable lens 16 is configured to be rotated around the rotary shaft R coupled to the motor 20 such that the direction of refraction of the light output from the semiconductor light-emitting element 18 and transmitted through the rotatable lens 16 varies periodically as shown in FIGS. 3A-3E. In this manner, scanning by using the light of the semiconductor light-emitting element 18 can be realized by a simple configuration such as appropriately devising the shape of the outer circumferential surface 16b of the rotatable lens 16.

Further, the semiconductor light-emitting element 18 according to the embodiment is arranged such that the frontal direction F of an output surface 18a (see FIG. 2) intersects (is substantially orthogonal to) the rotary shaft R. This causes the output surface 18a of the semiconductor light-emitting element 18 to face the inner circumferential surface 16a of the rotatable lens 16 in parallel.

Further, the rotatable lens 16 according to the embodiment is arranged such that the rotary shaft R is aligned with the direction of vehicle width Y of the vehicle. This reduces the space of the optical unit 12 in the vehicle longitudinal direction X.

The semiconductor light-emitting element 18 may be controlled by the control unit 22 such that the intensity of light varies in a certain phase range in the period of movement of the rotatable lens 16. This can change the brightness in a portion of the predetermined irradiated area. For example, a portion of the high beam light distribution pattern PH can be placed in a non-irradiated state by substantially extinguishing the semiconductor light-emitting element 18 by the control unit 22 at a point of time when the projected image I passes the position of FIG. 3F and lighting the semiconductor light-emitting element 18 at the other points of time.

Thus, the optical unit 12 according to this embodiment functions as a novel optical unit not found in the related art that scans the direction of light irradiation (front) with the transmitted light output from the light, by appropriately devising the surface shape of the rotatable lens 16.

Variation to the First Embodiment

In the optical unit 12 described above, one rotation of the rotatable lens 16 around the rotary shaft R causes the space in front scanned once by the projected image I from left to right. By appropriately devising the surface shape of the rotatable lens 16, it can also be ensured that one rotation of the rotatable lens causes the space in front to be scanned N times (N≥2) by the projected image I from left to right. Alternatively, by configuring the shape of the outer circumferential surface 16b of the rotatable lens 16 to result in the cross sectional shape in the order of FIG. 3A, FIG. 3B, FIG. 3C, FIG. 3B, FIG. 3A, FIG. 3E, FIG. 3D, FIG. 3E, and FIG. 3A, an optical unit in which the projected image I scans the space in front of the vehicle horizontally and reciprocally can be realized.

Second Embodiment

Figure 4:
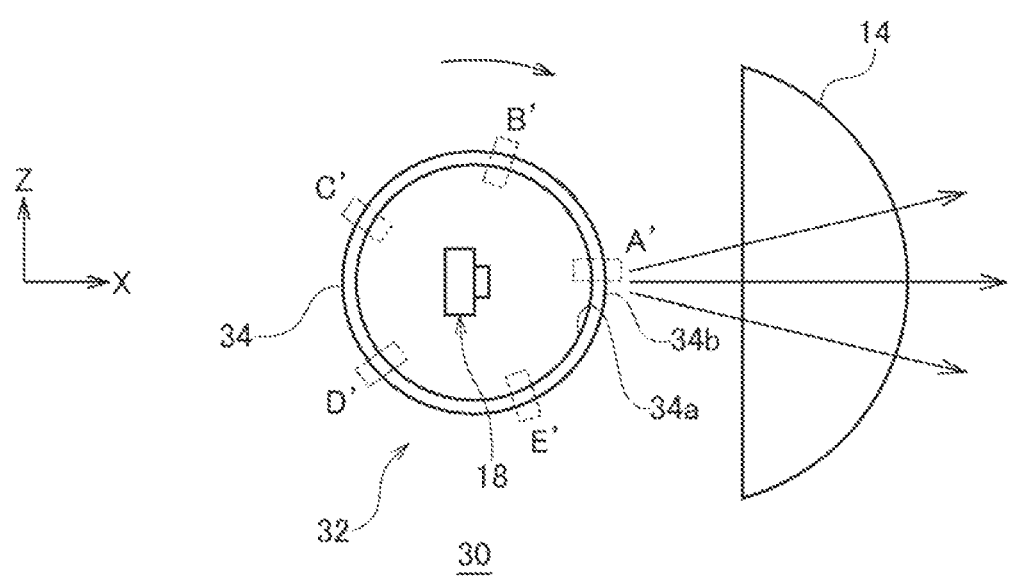
FIG. 4 is a schematic side view of the vehicle headlamp according to the second embodiment.

FIG. 4 is a schematic side view of the vehicle headlamp according to the second embodiment. Those features that are equivalent to the features of FIG. 1 and FIG. 2 are denoted by the same reference numerals and a description thereof is omitted as appropriate. The advantages and features different from those of the first embodiment will be highlighted.

A vehicle headlamp 30 includes an optical unit 32 and a projection lens 14 that projects a light source image output from the optical unit 32 in front of the vehicle. The optical unit 32 includes a cylindrical rotatable lens 34, a semiconductor light-emitting element 18 provided in the rotatable lens 34, a motor 20 provided to the side of the rotatable lens 34 and driving the rotatable lens 34 into rotation, and a control unit 22 that controls the lighting and extinguishing of the semiconductor light-emitting element 18 and the driving of the motor 20.

The rotatable lens 34 is configured such that the light output from the semiconductor light-emitting element 18 is incident via an inner circumferential surface 34a of the transmitting area and is output via an outer circumferential surface 34b of the transmitting area as an irradiating beam. Further, the rotatable lens 34 is driven by the motor 20 and is configured to form a predetermined irradiated area by scanning the space in front with the irradiating beam vertically according to a periodic movement (rotational movement) around the rotary shaft R.

Figure 5A:
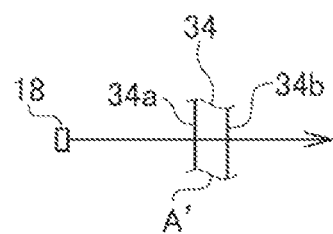
FIG. 5A shows area A' of the rotatable lens shown in FIG. 4.
Figure 5F:
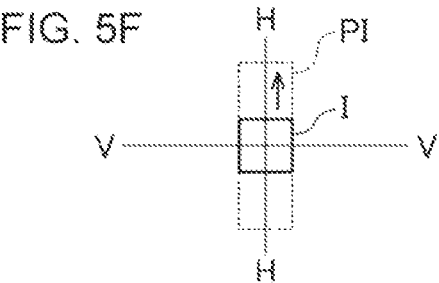
FIG. 5F shows a projected image formed by the irradiating beam transmitted through area A' shown in FIG. 5A.
Figure 5B:
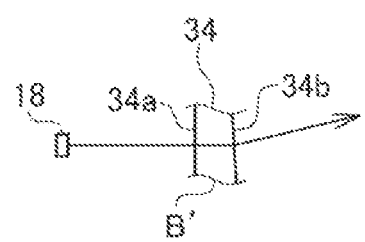
FIG. 5B shows area B' of the rotatable lens shown in FIG. 4.
Figure 5G:
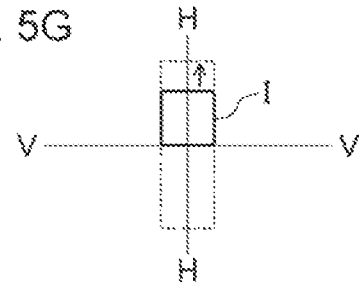
FIG. 5G shows a projected image formed by the irradiating beam transmitted through area B' shown in FIG. 5B.
Figure 5C:
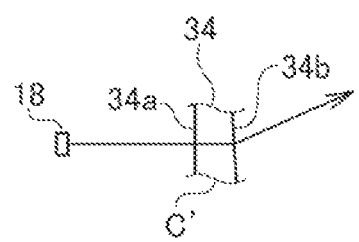
FIG. 5C shows area C' of the rotatable lens shown in FIG. 4.
Figure 5H:
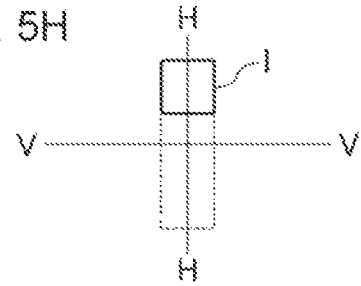
FIG. 5H shows a projected image formed by the irradiating beam transmitted through area C' shown in FIG. 5C.
Figure 5D:
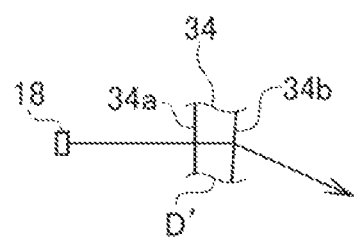
FIG. 5D shows area D' of the rotatable lens shown in FIG. 4.
Figure 5I:
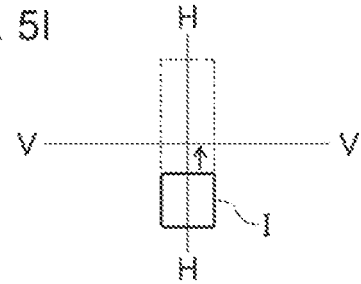
FIG. 5I shows a projected image formed by the irradiating beam transmitted through area D' shown in FIG. 5D.
Figure 5E:
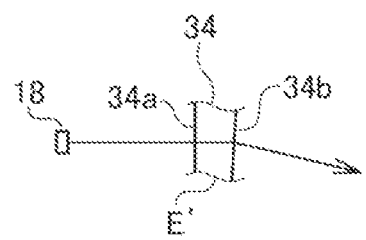
FIG. 5E shows area E' of the rotatable lens shown in FIG. 4.
Figure 5J:
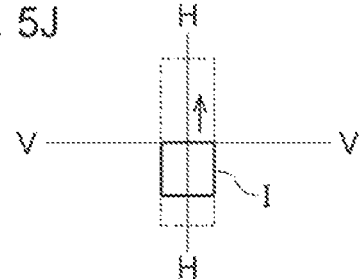
FIG. 5J shows a projected image formed by the irradiating beam transmitted through area E' shown in FIG. 5E.

FIG. 5A shows area A' of the rotatable lens shown in FIG. 4, FIG. 5B shows area B' of the rotatable lens shown in FIG. 4, FIG. 5C shows area C' of the rotatable lens shown in FIG. 4, FIG. 5D shows area D' of the rotatable lens shown in FIG. 4, FIG. 5E shows area E' of the rotatable lens shown in FIG. 4, FIG. 5F shows a projected image formed by the irradiating beam transmitted through area A' shown in FIG. 5A, FIG. 5G shows a projected image formed by the irradiating beam transmitted through area B' shown in FIG. 5B, FIG. 5H shows a projected image formed by the irradiating beam transmitted through area C' shown in FIG. 5C, FIG. 5I shows a projected image formed by the irradiating beam transmitted through area D' shown in FIG. 5D, and FIG. 5J shows a projected image formed by the irradiating beam transmitted through area E' shown in FIG. 5E.

Area A' is positioned at the angle of rotation of the rotatable lens 16 of 0 degrees, area B' is positioned at the angle of rotation of the rotatable lens 16 of 72 degrees, area C' is positioned at the angle of rotation of the rotatable lens 16 of 144 degrees, area D' is positioned at the angle of rotation of the rotatable lens 16 of 216 degrees, and area E' is positioned at the angle of rotation of the rotatable lens 16 of 288 degrees.

As shown in FIGS. 5F-5J, a projected image I moves gradually in the upward direction of the figure. Thus, the vehicle headlamp 30 can form a predetermined irradiated area (a light distribution pattern P1) by scanning the space in front with the irradiating beam according to the periodical movement of the cylindrical rotatable lens 34.

OTHER ADVANTAGES

The rigidity of a cylindrical rotatable lens can be higher as compared with a rotatable lens having a blade. Further, the rotary shaft R is perpendicular to the longitudinal direction of the optical unit (vehicle headlamp) so that a driving source can be provided to the side of the rotatable lens. Accordingly, the length of the longitudinal direction of the optical unit can be reduced. Further, in the embodiments described above, the light of the semiconductor light-emitting element is incident on the inner circumferential surface substantially perpendicularly so that the impact from refraction is little. For this reason, refraction of light transmitted through the rotatable lens and output from the outer circumferential surface need be primarily considered, and it is relatively easy to configure the surface shape of the outer circumferential surface. Conversely, an attempt to control refraction on the inner circumferential surface also requires considering refraction on the outer circumferential surface, which makes it difficult to configure the surface shape of the inner circumferential surface and the outer circumferential surface. Further, it is difficult to work the inner circumferential surface of the rotatable lens into a complicated shape, but it is relatively easy to work the outer circumferential surface.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

For example, a light source that emits invisible light such as infrared (IR)-LD, IR-LED, light detection and ranging (LiDAR) LD may be used in the optical unit according to the embodiments described above. This can realize an optical unit that can be applied to sensor devices and sensing support devices.

What is claimed is:

1. An optical unit comprising:
    a cylindrical rotatable lens; and
    a light source provided in the rotatable lens, wherein
    the rotatable lens is configured such that a light output from the light source is incident via an inner circumferential surface and is output via an outer circumferential surface as an irradiating beam, and a predetermined irradiated area is formed by scanning a space in front with the irradiating beam according to a periodical movement of the rotatable lens.

2. The optical unit according to claim 1, wherein
    the rotatable lens is configured to be rotated around a rotary shaft coupled to a driving unit such that a direction of refraction of a light output from the light source and transmitted through the rotatable lens varies periodically.

3. The optical unit according to claim 2, wherein the light source is arranged such that a frontal direction of an output surface intersects the rotary shaft.

4. The optical unit according to claim 2, wherein the rotatable lens is arranged such that the rotary shaft is aligned with a direction of vehicle width of the vehicle.

5. The optical unit according to claim 1, wherein the light source is configured such that an intensity of light varies in a certain phase range in a period of movement of the rotatable lens.

\* \* \* \* \*